United States Patent
Hauke et al.

(10) Patent No.: US 7,968,809 B2
(45) Date of Patent: Jun. 28, 2011

(54) SWITCHING DEVICE FOR AN ELECTRICAL SWITCHGEAR ASSEMBLY FOR ENERGY DISTRIBUTION

(75) Inventors: Peters Hauke, Hanau (DE); Daniel Kuhl, Frankfurt (DE)

(73) Assignee: ABB Technology AG, Zurich (CH)

( * ) Notice: Subject to any disclaimer, the term of this patent is extended or adjusted under 35 U.S.C. 154(b) by 244 days.

(21) Appl. No.: 12/302,216

(22) PCT Filed: Apr. 26, 2007

(86) PCT No.: PCT/EP2007/003663
§ 371 (c)(1),
(2), (4) Date: Nov. 24, 2008

(87) PCT Pub. No.: WO2007/134692
PCT Pub. Date: Nov. 29, 2007

(65) Prior Publication Data
US 2009/0152079 A1    Jun. 18, 2009

(30) Foreign Application Priority Data
May 23, 2006   (DE) .......................... 10 2006 024 007

(51) Int. Cl.
*H01H 9/26* (2006.01)
(52) U.S. Cl. .................. 200/50.32; 200/50.33
(58) Field of Classification Search .......... 361/605, 361/615, 621, 622, 627, 628, 631, 632, 634; 218/1–3, 12; 200/48 R–48 CB, 50.32–50.4, 200/318, 320, 323, 324, 327
See application file for complete search history.

(56) References Cited

U.S. PATENT DOCUMENTS

| | | | | |
|---|---|---|---|---|
| 6,320,143 | B1 * | 11/2001 | Greer | 200/50.33 |
| 6,872,900 | B1 * | 3/2005 | Lament et al. | 200/50.32 |
| 7,227,091 | B2 * | 6/2007 | Gacond et al. | 200/17 R |
| 7,432,465 | B2 | 10/2008 | Pavlovic et al. | |
| 7,435,920 | B1 * | 10/2008 | Yoo | 200/50.32 |
| 7,800,888 | B2 * | 9/2010 | Morris et al. | 361/614 |

FOREIGN PATENT DOCUMENTS

DE         29606345          6/1996
(Continued)

OTHER PUBLICATIONS

German Search Report for Patent Application No. DE 10 2006 024 007.3, dated Jan. 16, 2007.

*Primary Examiner* — Michael A Friedhofer
(74) *Attorney, Agent, or Firm* — Leydig, Voit & Mayer, Ltd.

(57) ABSTRACT

A switching device for an electrical switchgear assembly for power distribution includes a grounding function unit including a first moving control element selectably moveable to a first manual operation position and an isolation function unit including a second moving control element selectably to a second manual operation position. The grounding function unit is selectable to a manual operation state by moving the first moving control element to the first manual operation position, and the isolation function unit function unit is selectable to a manual operation state by moving the second moving control element to the second manual operation position. When the manual operation state is selected for one of the grounding and isolation function units, selection of the other of the grounding and isolation functional units to the manual operation state is blocked by a respective one of the first and second moving control elements.

14 Claims, 4 Drawing Sheets

FOREIGN PATENT DOCUMENTS

| | | |
|---|---|---|
| DE | 19534392 | 3/1997 |
| DE | 19900219 | 7/2000 |
| DE | 102004015386 | 10/2004 |
| EP | 1271588 | 1/2003 |
| EP | 1569254 | 8/2005 |
| GB | 1005694 | 9/1965 |

* cited by examiner (positions 130, 131 are not illustrated)

(positions 130, 131 are not illustrated)

(positions 130, 131 are not illustrated)

SWITCHING DEVICE FOR AN ELECTRICAL SWITCHGEAR ASSEMBLY FOR ENERGY DISTRIBUTION

This application is a U.S. National Phase application under 35 U.S.C. §371 of International Application No. PCT/EP2007/003663, filed on Apr. 26, 2007, which claims priority to German Patent Application No. DE 10 2006 024 007.3, filed on May 23, 2006. The International Application was published in German on Nov. 29, 2007 as WO 2007/134692 under PCT Article 21(2).

The present invention relates to a switching device for an electrical switchgear assembly, in particular for energy distribution.

BACKGROUND

Electrical switchgear assemblies for power distribution have an application-specific combination of different switching devices, also including isolating and grounding switches. Modern switchgear assemblies in this case combine the functions of isolation and grounding, in which a contact system can be moved to three appropriate positions. A switchgear assembly such as this has two function units—an isolator and a grounder. A three-position drive is required for this purpose. Manual operation of the switchgear assembly is envisaged for emergency operation.

Electrical switchgear assemblies for power distribution are known, for example, from the document EP 1 569 254.

SUMMARY OF THE INVENTION

An aspect of the present invention is to specify a switching device for an electrical switchgear assembly for power distribution, which complies with safety requirements for switchgear assemblies for high-current applications, and has a high safety level with regard to control errors.

According to a first preferred embodiment, a switching device is specified for an electrical switchgear assembly for power distribution which comprises a first function unit for the function of grounding and a second function unit for the function of isolation, wherein manual operation can be selected for at least one of the two function units. When manual operation is selected for the first function unit, the selection of manual operation for the second function unit is blocked by a moving control element of this function unit. When manual operation of the second function unit is selected, the selection of manual operation of the first function unit is blocked by a moving control element of this function unit.

The moving control element of each function unit can be set to the following operating positions:
A)(or D)) manual operation position,
B)(or E)) neutral position, in which the switchgear assembly is operated electrically,
C)(or F)) blocked position, in which the function unit is blocked, in which case neither electrical operation nor any manual change to the status of the switching device is possible.

The positions B) and C) of the two control elements can be selected independently of one another. In positions B) and C), the moving control elements do not block one another. In the latching position A) of a control element, the gate of this control element blocks the selection of the latching position A) of the other control element.

The mutual blocking of the selection of manual operation contributes to the safety function during manual operation of the drive.

For safety reasons, the manual operation may be equipped with at least one safety element, that is to say with an electrical circuit which allows manual operation.

Depending on the switching state of the switchgear assembly, release of the electrically operated blocking element may be separated for the ground and isolation side.

For this purpose, the switchgear assembly preferably comprises an electrically operated blocking element, by means of which the moving control element is locked for switching to the manual operation position when manual operation is not allowed. If an attempt is made to select manual operation, for example for the isolator side, safety information relating to whether manual operation is allowed is checked. If manual operation is allowed, for example for the isolator side, the electrically operated blocking element is pulled in, thus unlocking the moving control element.

The moving control element, for example on the isolator side, can now be moved to the actual position for manual operation A) or D). This releases an opening for insertion of an auxiliary element, for example a hand crank. At the same time, the geometric shape and arrangement of the control elements with respect to one another prevents that side of the switching device which has not been released, for example the grounder side, being able to be moved to the position A) or D).

When manual operation is not allowed, the electrically operated blocking element assumes a first position in which the movement of the moving control element of the two function units to the manual operation position is prevented. When manual operation is allowed, the electrically operated blocking element is moved by an electrical drive to a second position in which the moving control element is unlocked.

According to a second preferred embodiment, a switching device is specified for an electrical switchgear assembly for power distribution, which comprises a first function unit for the function of grounding, a second function unit for the function of isolation, and an electrically operated blocking element. Manual operation of both function units can be selected. Each function unit has a moving control element which, when manual operation is not allowed, is locked by means of the electrically operated blocking element for switching to the manual operation position. If an attempt is made to select manual operation, safety information relating to whether manual operation is allowed is checked. If manual operation is allowed, the electrically operated blocking element is operated, thus unlocking the moving control element.

The following text explains features which can occur in conjunction with both embodiments, but are not absolutely essential.

The first control element comprises a first gate, and the second control element a second gate. These gates can be moved with respect to one another. Each gate is firmly connected to a handle which can be operated by hand. The handle can be passed through the gate. A part of the handle may form an operating cam, which is coupled to an operating element of a switch.

The gates are geometrically designed such that they do not block one another when the control elements are in an operating position other than the manual operation position. By way of example, a gate is a thin plate or a metal sheet.

When the first gate is in the manual operation position, this prevents movement of the second gate to the position which corresponds to the manual operation position. When the second gate is in the manual operation position, this prevents movement of the first gate to the position which corresponds to the manual operation position.

The electrically operated blocking element is preferably arranged between the gates of the first and second function units.

The switchgear assembly preferably comprises a locking element which makes it possible to prevent inadvertent switching between the various operating positions. The locking element preferably comprises a tension spring and a control button. The locking element can be recessed. The locking element or the control button preferably has an area with a narrowed cross section, which is arranged between two areas with a broader cross section.

Each gate preferably has an opening which is in the form of a channel and whose width outside the areas which are intended to be used as a latching position is less than the cross-sectional size of the broad areas of the locking element. In areas which are intended to be used as a latching position, the opening which is in the form of a channel has a width which is greater than the cross-sectional size of the broad areas of the locking element.

Each control element preferably has an operating cam which is firmly connected to the gate of the respective function unit. The operating cam may have a depression into which an operating element of an electrical switch projects. In the movement direction, the profile of the depression is of such a size that the operating element is moved between the operating positions in the vertical direction when the control element is moved. The operating element of the electrical switch preferably has sprung characteristics. By way of example, it may be a bent or folded leaf spring.

The electrical switch is preferably electrically connected to a safety circuit for evaluation of the safety information.

In one exemplary embodiment, the gates can be moved in a longitudinal direction with respect to one another. The gates are preferably each guided by a rail along which they can slide. In this case, when the first gate is in the manual operation position, this gate prevents the movement of the second gate to the position which corresponds to the manual operation position. Conversely, when the second gate is in the manual operation position, this gate prevents the movement of the first gate to the position which corresponds to the manual operation position.

In one variant, the first control element comprises a first gate, which can be pivoted about a first rotation axis, and the second control element comprises a second gate, which can be pivoted about a second rotation axis. When the first gate is being pivoted, this results in a change in the operating position of the first control element. When the second gate is being pivoted, this results in a change in the operating position of the second control element.

The gates can preferably be pivoted with respect to one another. The gates which can be pivoted are also referred to as gate levers.

The first gate preferably has a projection which pivots into a recess in the second gate on selection of position A) of the first control element, thus blocking the selection of the manual operation position. The second gate, analogously to this, likewise has a projection which pivots into a recess in the first gate on selection of position A) of the second control element, thus blocking the selection of the manual operation position.

When the first gate is in the manual operation position, this gate prevents the second gate from pivoting into the position which corresponds to the manual operation position. Analogously to this, when the second gate is in the manual operation position, this gate prevents the first gate from pivoting into the position which corresponds to the manual operation position.

Each function unit comprises a hand crankshaft which can be operated manually when manual operation is allowed and which, when the control element of this function unit is in an operating position other than the manual operation position, is covered by the gate of this control element. In one advantageous variant, each gate has a recess which is positioned in the manual operation position such that the hand crankshaft is exposed.

Each control element may comprise a stopper which is firmly connected to the gate of this control element. The hand crankshaft preferably has projections which extend in radial directions, that is to say in a direction at right angles to the rotation axis of the crankshaft, and strike against the stopper in the blocking position during rotation of the hand crankshaft.

The handle may have an area with a narrowed cross section, which is arranged between two areas with a broader cross section. In conjunction with this, the switchgear assembly preferably has a cover plate which has a first opening in the area of the first crankshaft, and a second opening in the area of the second crankshaft. For each function unit, the cover plate has an opening which is in the form of a channel and whose width outside the areas which are intended to be used as a latching position is less than the cross-sectional size of the broader areas of the handle. In areas which are intended to be used as a latching position, the opening which is in the form of a channel has a width which is at least as large as the cross-sectional size of the broader areas of the handle.

In a further embodiment, after the lock has been unlocked, the control element can be moved back to the neutral position B) or E) by a return element, for example in the form of an M-shaped return spring.

The handle is preferably coupled to an operating element of an electrical switch which is electrically connected to the circuit for evaluation of the safety information. The circuit for evaluation of the safety information is preferably electrically connected to a solenoid, which pulls in the blocking element when manual operation is allowed by the circuit for evaluation of the safety information.

A free space is provided between the gates in position B), which free space is covered by movement of one of the gates to position A) to such an extent that movement of the other gate to position A) is blocked.

The manual operation interlock can in principle be provided by means of linearly movable control elements which, for example, comprise slide gates, or by means of control elements which can pivot and, for example, comprise levers, and in particular gate levers. The manual operation interlock is designed such that it results in unambiguous control guidance, taking account of the locking and safety conditions, via the control elements and solenoids. Only a single solenoid is required for this purpose, since this is ensured by appropriate interlocking. Furthermore, separate blocking of the individual functions (isolator/grounder) is possible since one hand crank hole is in each case provided for each function unit both in the gate and in the cover plate.

BRIEF DESCRIPTION OF THE DRAWINGS

Furthermore, exemplary embodiments will be explained with reference to schematic figures, which are not to scale, in which.

DETAILED DESCRIPTION

Figure 1A:
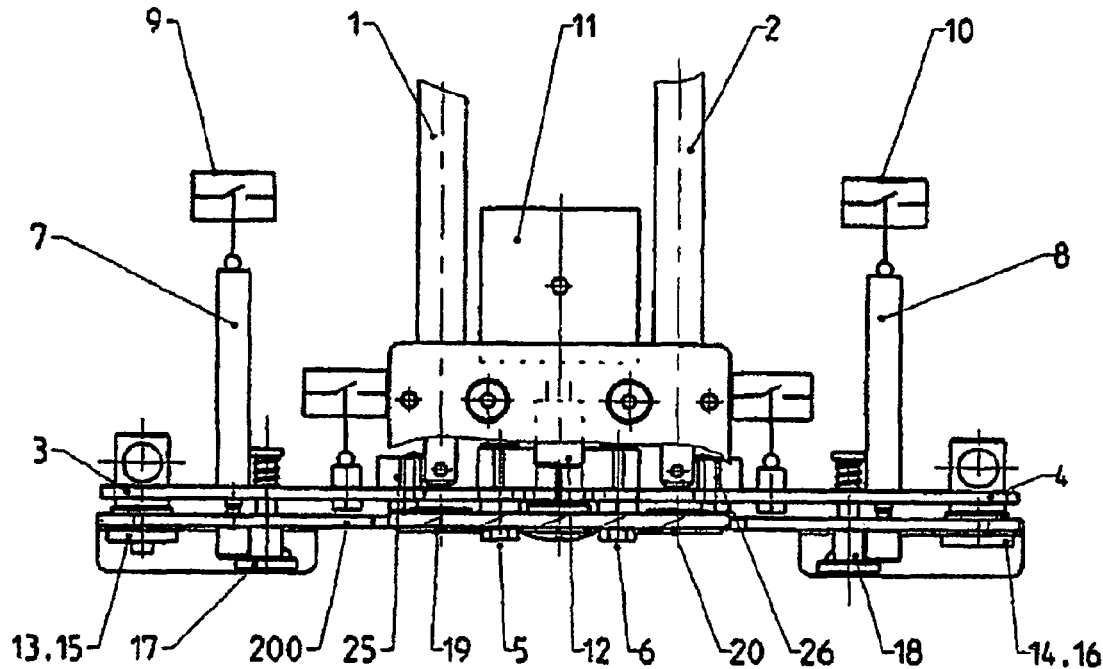
FIG. 1A shows the plan view of a switching device with gate levers which can pivot.
Figure 1B:
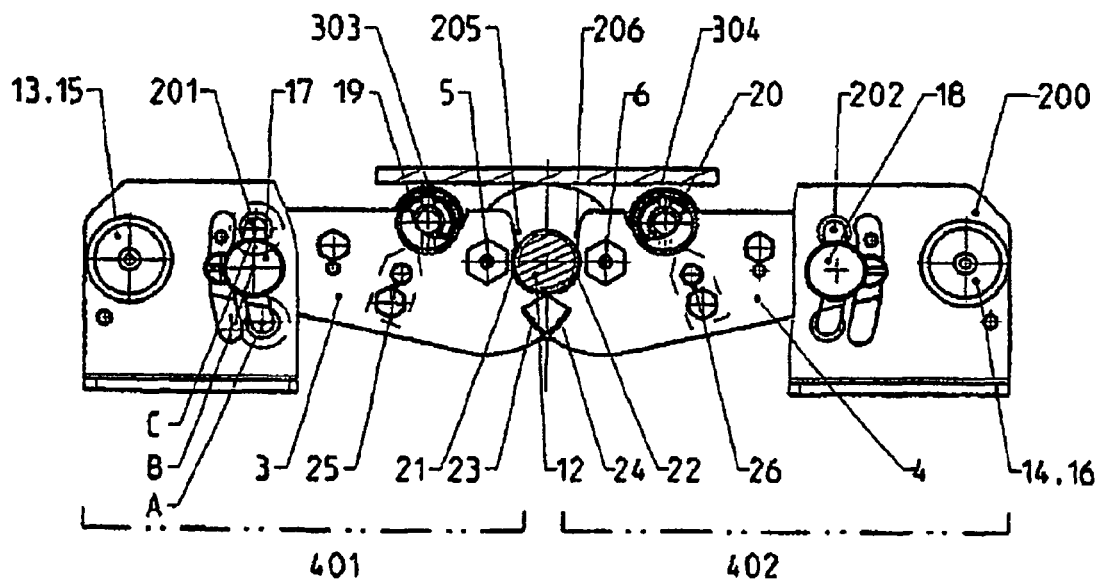
FIG. 1B shows the front view of the switching device shown in FIG. 1A in the neutral position.

FIGS. 1A, 1B show an exemplary embodiment of a switchgear assembly with control elements which can pivot. The switchgear assembly comprises two function units: an isolator 401 (on the left) and a grounder 402 (on the right). These function units are preferably symmetrical with respect to an axis of symmetry which runs through the center point of the assembly.

The manual operation interlock comprises two hand crankshafts 1 (for the isolator) and 2 (for the grounder). These crankshafts are associated with two gate levers 3, 4. The gate lever 3 is mounted at the rotation point 5, and the gate lever 4 at the rotation point 6. An operating cam 7, 8 is fitted to each gate lever and acts on the operating element of a switching element 9, 10 during rotation.

The switching elements 9, 10 are used for electrical locking and deactivation. Each switching element is electrically connected to a downstream control and protection circuit and is suitable for checking safety information. The operating cams 7, 8 are designed to be matched to the requirements for control and protection.

A locking magnet 11 with an electrically operated blocking element 12 (locking pin) is located between the gate levers 3, 4. The gate levers are equipped with a removable locking element 13, 14 which has an opening 15, 16 for hooking a padlock into. The locking element 13, 14 is preferably a blocking bolt. The gate lever 3, 4 is firmly connected to an operating handle 17, 18, which can be latched in three positions A, B, C. Switching between the positions A, B, C is carried out manually with the aid of the handle 17, 18.

The latching position A represents manual crank operation/ emergency operation. The latching position B represents the neutral position, in which the switchgear assembly is operated electrically (normal operation). The latching position C is the blocked position, in which the switchgear assembly is blocked such that it cannot be switched either electrically or mechanically.

The gate levers 3, 4 are designed and are positioned relative to one another such that these three latching positions are possible.

The switchgear assembly comprises a cover plate 200, which has an opening 201, 202 for each function unit. This opening is in the form of a channel and is designed with broadened areas at those points which define the latching positions A, B and C of the control element. The cover plate 200 has a hand crank hole 19, 20 for each function unit.

The gate lever 3, 4 has a first recess 205, 206 with a touching area 21, 22. When the respective control element is moved to position A, the touching area 21, 22 is moved in the direction of the blocking element 12. When manual operation is not allowed, the touching area 21, 22 is blocked by the blocking element 12, before the handle 17, 18 reaches the latching position A. The gate lever 3, 4 also has a locking projection 23, 24. The gate lever 3, 4 has a second recess 303, 304 which at least partially covers the hand crank hole 19, 20 in the latching positions B, C.

A hole through which the blocking bolt 13 is passed is provided in the gate lever 3, 4. Three openings, through which the blocking bolt 13 can be passed in the latching positions A, B, C, are preferably provided in the cover plate 200. However, this may also be a single opening.

The method of operation of a function unit of the switching device for the isolator will now be explained. However, the description also applies, without any restriction, to the grounder.

In the neutral position B, the hand crank holes 19, 20 are covered by a part of the gate lever 3, 4. If manual operation to position A (for example in the case of the isolator) is intended, the blocking bolt 13 is first of all removed. After this, the operating handle 17 is pulled out of the latching position B or C, and is moved in the direction of the latching position A.

Before the touching area 21 of the gate lever 3 reaches a position at which the locking pin 12 is arranged, the switching element 9 is operated via the operating cam 7, thus initiating the process of checking whether manual operation is allowed. If manual operation is allowed, the locking magnet 11 pulls in the locking pin 12, as a result of which the gate lever 3 is unlocked and can be moved to the latching position A.

In order to prevent the possibility of the gate lever 4 of the right-hand function unit now also being moved to the latching position A when the blocking element 12 is pulled in, the locking projection 23 of the gate lever 3 is pivoted into the first recess 206 in the gate lever 4. In this case, the gate lever 4 is blocked by the locking projection 23 against movement to the latching position A. When one gate is in the latching position A, this therefore locks the gate of the other function unit such that it cannot assume the latching position A.

The operating handle 17 latches in in the latching position A. This means that the second recess 303 in the gate lever 3 completely exposes the hand crank hole 19. This allows access to the hand crankshaft 1. The hand crankshaft 1 preferably has at least one latching element, such that it is possible to engage a hand crank for operation of the crankshaft (lock-and-key principle). The hand crank is passed through the opening 19 in the cover plate 200 and the second recess 303 in the gate lever 3. In the variant shown in FIGS. 1A, 1B, the latching element is in the form of a radial projection. The hand crank has a depression which is designed to be complementary to this. Conversely, it is also possible for the crankshaft to be formed with a depression, and the hand crank with a complementary projection.

In the latching position A, the left-hand function unit is electrically blocked by the switching element 9, which is operated by the operating cam 7. Depending on the design of the control and protection circuit, the right-hand function unit can likewise be electrically blocked against operation in this position.

If it is found that manual operation is not allowed on checking via the cam 7, the locking pin 12 remains in the extended state, as a result of which the gate lever 3 can be blocked, and cannot be moved to the latching position A. The hand crank hole 19 is still covered by a part of the gate lever 3, so that the user cannot access the hand crankshaft.

If the left-hand function unit is intended to be blocked, starting from the neutral position B, the gate lever 3 is moved to the latching position C. The blocking bolt 13 must be removed again before moving to the latching position C. After this, the operating handle 17 is pulled out of the latching position, and is moved in the direction of the position C. The operating handle 17 latches in on reaching the position C. The blocking bolt 13 is then inserted again. At the same time, the left-hand function unit is electrically locked via the operating cam 7, and the hand crankshaft 1 is mechanically blocked with the aid of the stopper 25. A lock can be hooked into the hole 15 in the blocking bolt 13.

The locking magnet 11 is preferably not operated for blocking the function unit in the latching position C. This is important in order to ensure that the hand crank check still remains activated for the other function unit, so that the right-hand function unit—except for the latching position A—can be operated independently of the left-hand function unit.

The gate levers 3, 4 are designed such that the gate lever 4—taking account of whether this is allowed by the control and protection circuit—can be moved even when the lever 3 is in the latching position C or B. Both sides of the drive can therefore be locked separately. However, manual crank operation is in each case only ever possible for one function unit, when this is allowed after checking the safety information. Electrical operation is ensured in the neutral position B.

The right-hand function unit comprises a stopper 26 and a blocking bolt 14 which has a hole 16. The blocking bolt 14 is designed like the blocking bolt 13. The hole 16 corresponds to the hole 15. The stopper 26 corresponds to the stopper 25.

According to further embodiments, which are explained in FIGS. 2A to 5, the manual operation interlock is designed with slides 103, 104 which can be moved linearly. The rotation points 5, 6, which are shown in FIGS. 1A, 1B, are in this case replaced by linear guides 105, 106. A linear guide preferably comprises at least one rail. The elements which are comparable with the elements 1, 2 and 7 to 24 are also provided in this variant, and, for ease of comparison, are provided with numbers increased by 100.

Figure 2A:
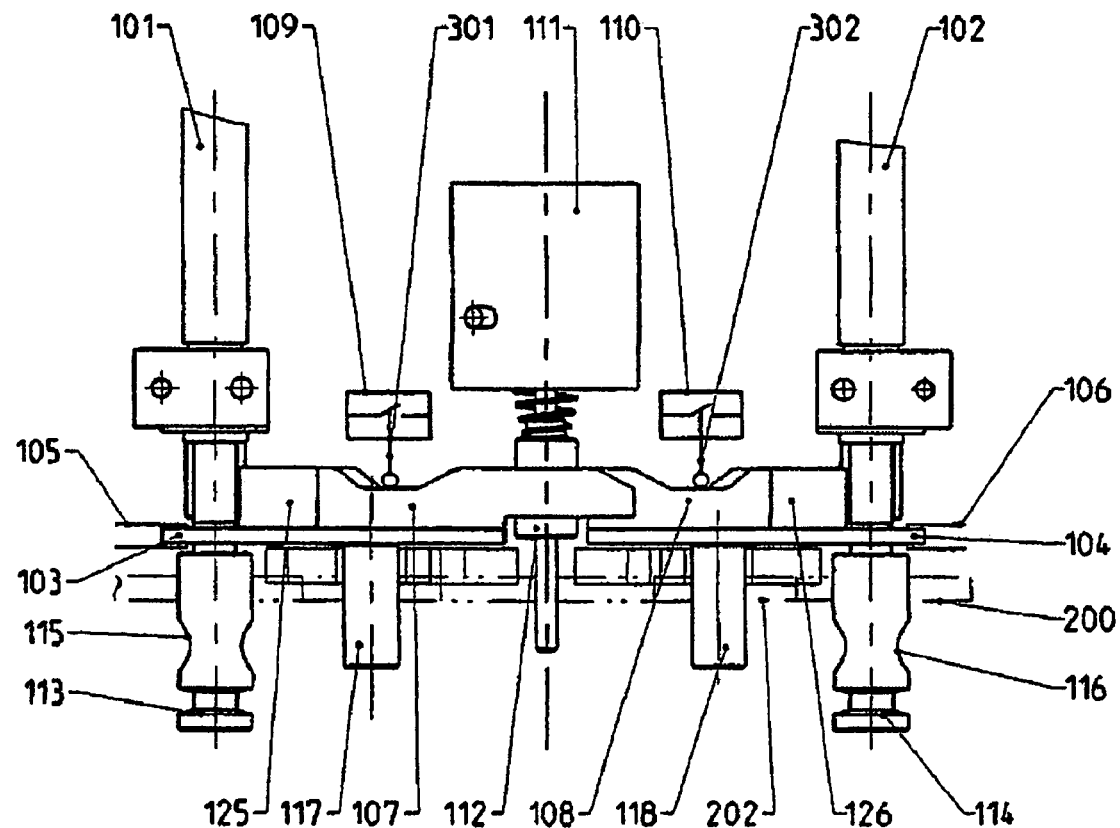
FIG. 2A shows the plan view of a switching device with linearly movable gates.
Figure 2B:
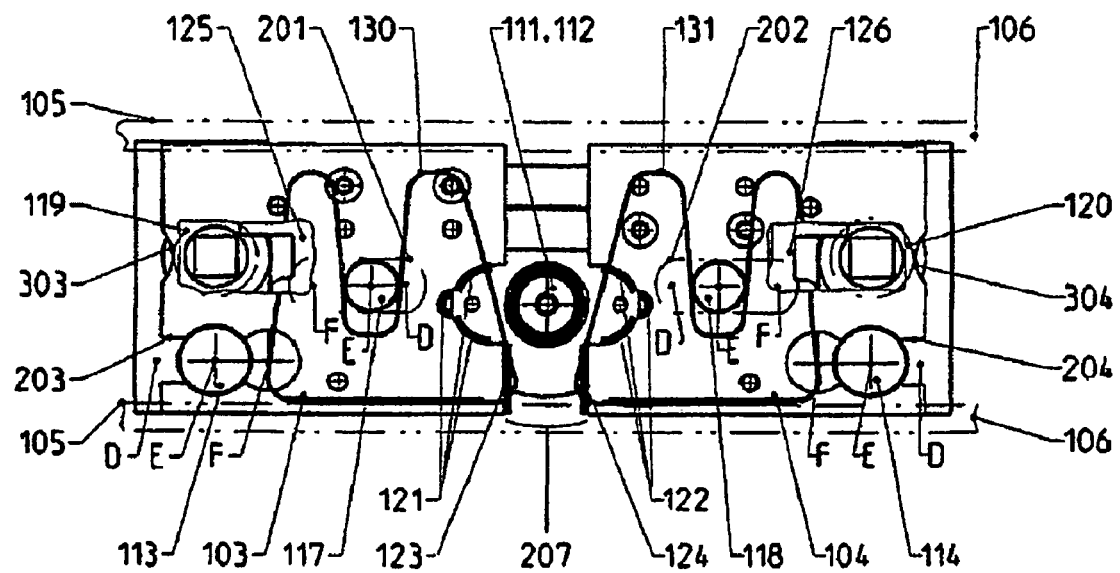
FIG. 2B shows the front view of the switching device shown in FIG. 2A, in the neutral position.
Figure 3:
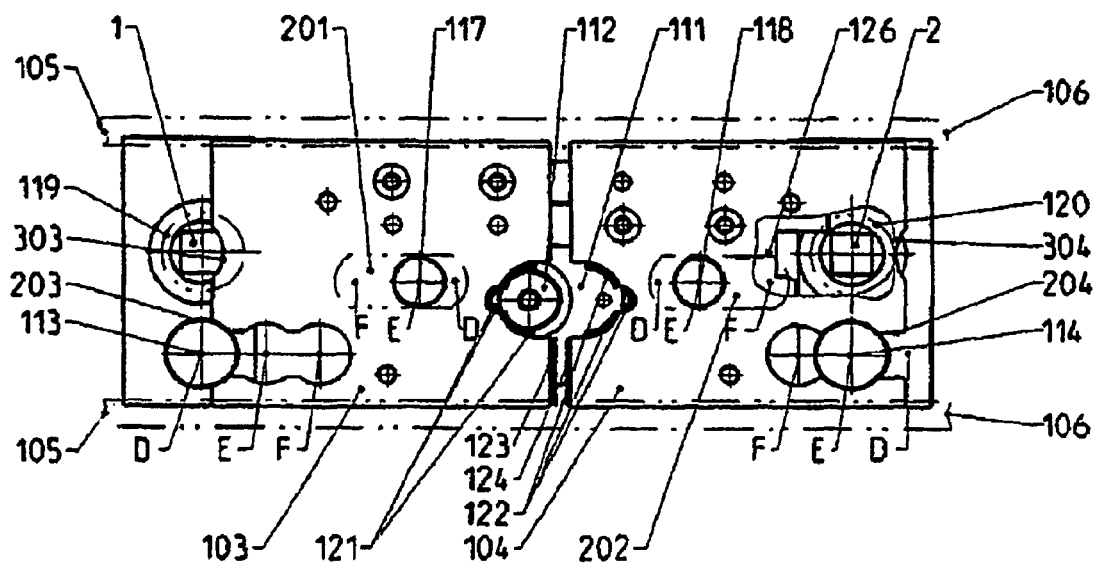
FIG. 3 shows the front view of the switching device shown in FIG. 2A during movement from the neutral position into the manual operation position when manual operation has not yet been allowed.
Figure 4:
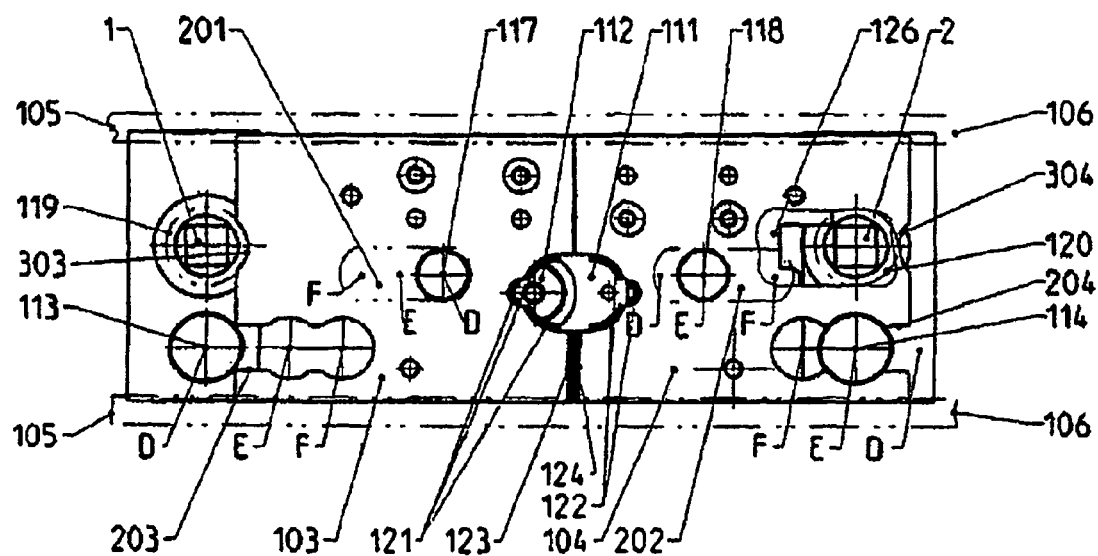
FIG. 4 shows the front view of the switching device shown in FIG. 2A, in the manual operation position with manual operation allowed.
Figure 5:
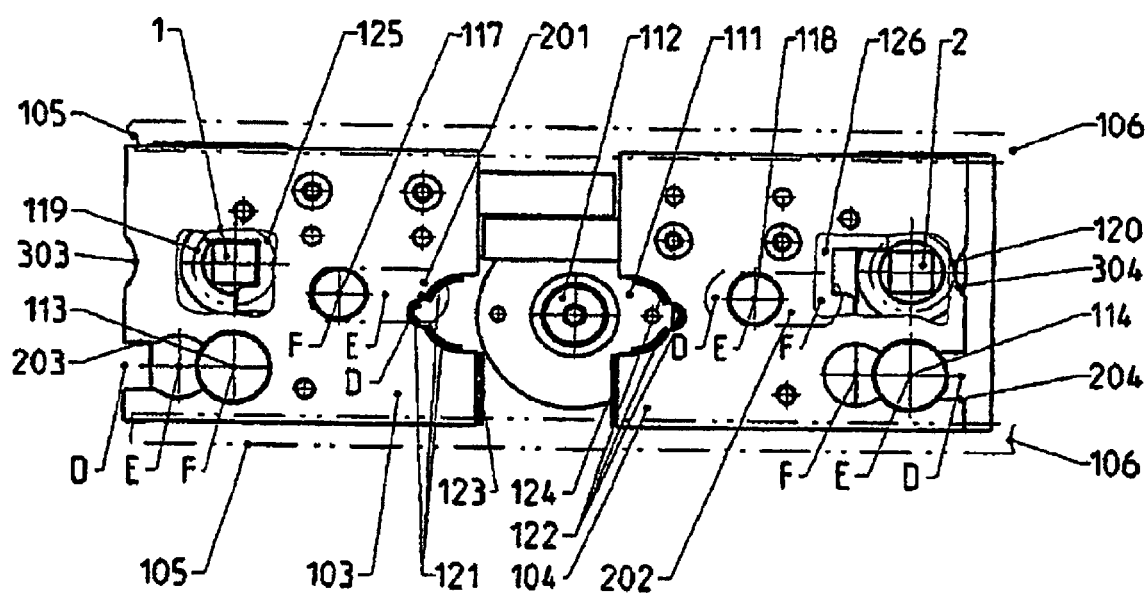
FIG. 5 shows the front view of the switching device shown in FIG. 2A in the blocking position.

FIGS. 2A, 2B show the neutral position E of the moving control elements of the two function units. FIG. 3 shows the movement of the control element of the left-hand function unit from the position E to the position D, and FIG. 4 shows the position D of this control element. FIG. 5 shows the position F of this control element.

The slides have three latching positions D, E, F. The latching position D corresponds to the latching position A in the variant with gate levers which can pivot. The latching position E corresponds to the latching position B, and the latching position F to the latching position C.

The slides 103, 104 are designed and positioned relative to one another such that these three latching positions are possible. In this variant as well, each gate 103, 104 has a second recess 303, 304, which is likewise intended to expose the hand crankshaft when manual operation is allowed. Each slide gate 103, 104 also has a third recess 203, 204 which is designed essentially in the same way as the openings 201, 202 in the cover plate 200 in the variant shown in FIG. 1B. The third recess 203, 204 is in the form of a channel with broadened areas at the points which define the latching positions D, E and F of the control element.

The blocking bolt 113, 114 preferably comprises a control button which can be recessed and projects out of the cover plate 200 in the latching positions D, E, F. The blocking bolt 113, 114 furthermore comprises a tension spring. The blocking bolt 113, 114 in this variant is designed such that it can be recessed in a spring-loaded manner, that is to say it can be pushed in. Once the blocking bolt 113, 114 has been recessed, the slide 103, 104 can be operated. The blocking bolt 113 carries out the function of "latching" of the operating handle 17 in the variant shown in FIGS. 1A and 1B. In contrast to the variant shown in FIGS. 1A, 1B, the opening 201, 202 in the cover plate 200 is implemented in the form of a channel without any broadened areas in the latching positions. Otherwise, the conditions are the same. The features which have been described for the handle 17, 18 can be transferred without any restriction to the blocking bolt 113, 114. In particular, like the handle 17, 18, the blocking bolt 113, 114 has an area with a narrowed cross section. Like the blocking bolt 13, 14, the blocking bolt 113, 114 has a hole 115, 116 for a padlock to be passed through.

The latching position D represents manual crank operation/emergency operation. The latching position E represents the neutral position, in which the switchgear assembly is electrically operated (normal operation). The latching position F is the blocked position, in which the switchgear assembly is blocked such that it cannot be switched either electrically or mechanically.

A free space 207 is provided between the slide gates 101, 102 in position E), which free space 207 is covered by movement of one of the slide gates to position D) to such an extent that movement of the other slide gate to position D) is blocked.

In the neutral position E, the hand crank holes 119, 120 in the cover plate 200 are covered by a part of the slide 103, 104. If manual operation is now intended to the latching position D (for example for the left-hand function unit), the blocking bolt 113 is first of all pressed. The operating handle 117 is then moved in the direction of the latching position D.

Before the touching area 121 of the slide gate 103 reaches a position at which the locking pin 112 is arranged, the switching element 109 is operated via the operating cam 107, thus initiating the check of whether manual operation is allowed. If manual operation is allowed, the locking magnet 111 pulls in the locking pin 112, thus unlocking the slide gate 103 and allowing movement to the latching position D.

In order to prevent the slide gate 104 of the right-hand function unit now also being moved to the latching position D when the blocking element 112 is pulled in, the slide 104 is blocked—when the slide gate 103 is in the latching position D—by the locking area 123 of the slide 103 against movement to the latching position D. When a slide gate is in the latching position D, this thus locks the slide gate of the other function unit such that it cannot assume the latching position D.

The blocking bolt 113 latches in in the latching position D. This means that the second recess 303 in the slide gate 103 completely exposes the hand crank hole 119. This allows access to the hand crankshaft 101.

The left-hand function unit is electrically blocked in the latching position D by the switching element 109, which is operated by the operating cam 107. Depending on the design of the control and protection circuit, the right-hand function unit can likewise be electrically blocked against operation in this position.

If manual operation is not allowed on checking via the cam 107, the locking pin 112 remains in the extended state, as a result of which the slide gate 103 is blocked and cannot be moved to the latching position D. The hand crank hole 119 is still covered at least by a part of the slide gate 103, so that the user cannot access the hand crankshaft.

If the intention is to block the left-hand function unit starting from the neutral position E, the slide gate 103 is moved to the latching position F. The blocking bolt 13 is pressed before movement to the latching position F. The operating handle 117 is then moved in the direction of the latching position F. On reaching the position F, the blocking bolt 113 latches in. At the same time, the left-hand function unit is electrically locked via the operating cam 107, and the hand crankshaft 101 is mechanically blocked with the aid of the stopper 125. A lock can be hooked into the hole 115 in the blocking bolt 113.

The locking magnet 111 is preferably not operated for blocking the function unit in the latching position F. This is important in order to ensure that the hand crank check still remains activated for the other function unit, such that the right-hand function unit can be operated in the latching positions E, F independently of the left-hand function unit.

The slide gates 103, 104 are designed such that the slide gate 104—taking account of whether this is allowed by the control and protection circuit—can be moved even when the slide 103 is in the position F or E.

Both sides of the drive can thus be locked separately. However, hand crank operation is in each case only ever possible for one function unit, when this is allowed after checking the safety information. Electrical operation is ensured in the neutral position E.

The operating cam 117, 118 has a depression into which an operating element 301, 302 of an electrical switch 109, 110 projects. The profile of the depression in the movement direction is of such a size that the operating element 301, 302 is moved in the vertical direction when the control element is moved between the operating positions. The operating element of the electrical switch 109, 110 may, for example, be a leaf spring.

The specified switching device is not restricted to the above examples. The number and form of the elements shown can be chosen as required in order to provide the described method of operation of the function unit.

For example, the blocking bolts 113, 114 can be designed such that they must be pulled against a spring element in order to lock the gate 103, 104 in the position D, E, F. In the pulled state, the blocking bolt 113, 114 can be locked, for example by a padlock, via the hole 115, 116. When the padlock is removed, the spring element pulls the blocking bolt back and releases the gates 103, 104. If this was previously in the position D) or F), it is moved back via a return spring 130, 131, for example M-shaped leaf spring, to the neutral position D), and is held there. There is then no need for latching. All the other described characteristics remain unchanged in this case.

LIST OF REFERENCE SYMBOLS

1 First crankshaft
2 Second crankshaft
3 First gate lever
4 Second gate lever
5 First rotation axis
6 Second rotation axis
7, 8 Operating cam
9, 10 Switch
11 Solenoid
12 Electrically operated blocking element
13, 14 Locking element
15, 16 Hole in the locking element
17, 18 Handle
19, 20 Opening in the cover plate 200
21 Touching area of the first gate lever 3
22 Touching area of the second gate lever 4
23 Locking projection of the first gate lever 3
24 Locking projection of the second gate lever 4
25, 26 Stopper
101 First crankshaft
102 Second crankshaft
103 First gate
104 Second gate
105 Rail for guiding the first gate
106 Rail for guiding the second gate
107, 108 Operating cam
109, 110 Switch
111 Solenoid
112 Electrically operated blocking element
113, 114 Locking element
115, 116 Hole in the locking element
117, 118 Handle
119, 120 Opening in the cover plate 200
121 Touching area of the first gate 103
122 Touching area of the second gate 104
123 Locking area of the first gate 103
124 Locking area of the second gate 104
125, 126 Stopper
130, 131 Return spring
200 Cover plate
201, 202 Opening in the cover plate 200
203, 204 Third recess in the gates
205, 206 First recesses in the gates
207 Free space
301 Operating element of the electrical switch 109
302 Operating element of the electrical switch 110
303, 304 Second recess in the gates
401 First function unit of the switching device
402 Second function unit of the switching device

What is claimed is:

1. A switching device for an electrical switchgear assembly for power distribution, the switching device comprising:
    a grounding function unit including a first moving control element selectably moveable to a first manual operation position;
    an isolation function unit including a second moving control element selectably moveable to a second manual operation position; and
    at least one electrically operated blocking element moveable between a nonblocking position and a blocking position as a function of safety information, wherein the blocking element in the blocking position blocks at least one of the first and second control elements from moving to the respective manual operation position,
    wherein the grounding function unit is selectable to a manual operation state by moving the first moving control element to the first manual operation position,
    wherein the isolation function unit function unit is selectable to a manual operation state by moving the second moving control element to the second manual operation position, and
    wherein when the manual operation state is selected for one of the grounding and isolation function units, selection of the other of the grounding and isolation functional units to the manual operation state is blocked by a respective one of the first and second moving control elements.

2. The switching device as recited in claim 1, wherein each of the first and second moving control element is further moveable to a respective first and second neutral position, in which the switchgear assembly is operated electrically, and to a respective first and second blocked position, in which the respective function unit is blocked, and wherein when one of the first and second moving control elements is in the respective blocked or neutral positions, it does not block movement of the other of the first and second moving control element.

3. The switching device as recited in claim 1, wherein the first control element includes a first gate and the second control element includes a second gate, wherein the first and second gates are moveable relative to each other and wherein moving one of the first and second gates into the respective manual operation position blocks movement of the other of the first and second gates into the respective manual operation position.

4. The switching device as recited in claim 1, wherein the first control element includes a first gate and the second control element includes a second gate, and wherein the at least one electrically operated blocking element is disposed between the first and second gates.

5. The switching device as recited in claim 1, wherein each of the first and second moving control elements includes an operating cam, and wherein when the respective first and second control element is moved to the respective manual operation position, the operating cam moves an operating element of an electrical switch.

6. The switching device as recited in claim 5, wherein the electrical switch is electrically connected to a safety circuit for evaluation of the safety information.

7. The switching device as recited in claim 3, wherein each of the first and second gates is moveable in a direction opposite to the other.

8. The switching device as recited in claim 3, wherein each of the first and second gates is rockable in a direction opposite to the other.

9. The switching device as recited in claim 3, wherein each of the grounding and isolation function units includes a manually operable hand crankshaft, and wherein when a respective one of the first and second control element is in the neutral or blocked positions, the respective first or second gate covers the respective hand crankshaft, and wherein when the respective one of the first and second control elements is in the manual operation position a recess in the respective first and second gate exposes the hand crankshaft.

10. The switching device as recited in claim 9, wherein each of the first and second control elements includes a stopper, and wherein, when the respective control element is in the blocked position, the stopper blocks access to the respective hand crankshaft.

11. The switching device as recited in claim 3, wherein each gate has a projection and a recess, wherein upon movement of one of the first and second gates into the manual operation position, the respective projection is pivoted into the recess of the other of the first and second gates so as to block movement of the respective gate into the manual operation position.

12. The switching device as recited in claim 6, wherein the safety circuit is electrically connected to a solenoid configured to move the blocking element.

13. The switching device as recited in claim 7, wherein a free space is provided between the first and second gates in the neutral position, and wherein the free space is covered by movement of one of the gates to the manual operation position so as to block movement of the other gate to the manual operation position.

14. A switching device for an electrical switchgear assembly for power distribution, the switching device comprising:
   a grounding function unit including a first moving control element selectably moveable to a first manual operation position, the grounding function unit being selectable to a manual operation state by moving the first moving control element to the first manual operation position;
   an isolation function unit including a second moving control element selectably to a second manual operation position, the isolation function unit function unit being selectable to a manual operation state by moving the second moving control element to the second manual operation position;
   an electrically operated blocking element configured to block at least one of the first and second moving control elements from moving to the respective first and second manual operation positions based on a function of safety information.

\* \* \* \* \*